(12) United States Patent
Miller et al.

(10) Patent No.: US 9,935,829 B1
(45) Date of Patent: Apr. 3, 2018

(54) SCALABLE PACKET PROCESSING SERVICE

(71) Applicant: Amazon Technologies, Inc., Reno, NV (US)

(72) Inventors: Kevin Christopher Miller, Herndon, VA (US); Bashuman Deb, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 275 days.

(21) Appl. No.: 14/495,372

(22) Filed: Sep. 24, 2014

(51) Int. Cl.
  *H04L 12/24* (2006.01)
  *H04L 12/26* (2006.01)
  *G06F 15/177* (2006.01)
  *G06F 9/455* (2006.01)

(52) U.S. Cl.
  CPC .......... *H04L 41/0816* (2013.01); *G06F 9/455* (2013.01); *G06F 15/177* (2013.01); *H04L 41/085* (2013.01); *H04L 43/16* (2013.01)

(58) Field of Classification Search
  CPC ... H04L 41/0816; H04L 41/085; H04L 43/16; G06F 9/455; G06F 15/177
  See application file for complete search history.

(56) References Cited

U.S. PATENT DOCUMENTS

| | | | |
|---|---|---|---|
| 7,228,564 B2 | 6/2007 | Raikar et al. | |
| 7,325,239 B2 | 1/2008 | Hariharan et al. | |
| 7,512,980 B2 | 3/2009 | Copeland et al. | |
| 8,005,098 B2 | 8/2011 | Barach et al. | |
| 8,161,550 B2 | 4/2012 | Keen et al. | |
| 8,296,847 B2 | 10/2012 | Mendonca et al. | |
| 8,640,239 B2 | 1/2014 | Lukas et al. | |
| 8,656,492 B2 | 2/2014 | Boot et al. | |
| 8,752,173 B2 | 6/2014 | Yadav | |
| 2011/0022694 A1* | 1/2011 | Dalal | H04L 41/0843 709/222 |
| 2011/0255538 A1* | 10/2011 | Srinivasan | H04L 41/0893 370/392 |
| 2013/0041987 A1 | 2/2013 | Warno | |
| 2013/0132545 A1* | 5/2013 | Schultze | H04L 41/00 709/223 |
| 2013/0191881 A1* | 7/2013 | Linden | G06F 11/181 726/3 |

(Continued)

OTHER PUBLICATIONS

U.S. Appl. No. 13/339,985, filed Dec. 29, 2011, Eric W. Schultze.

*Primary Examiner* — Arvin Eskandarnia
*Assistant Examiner* — Amy Ling
(74) *Attorney, Agent, or Firm* — Robert C. Kowert; Meyertons, Hood, Kivlin, Kowert & Goetzel, P.C.

(57) ABSTRACT

A control-plane component of a virtualization-based packet processing service determines (a) a performance goal for a first category of packet processing operations to be implemented using compute instances of a virtual computing service and (b) one or more packet processing rules. The control-plane component assigns one or more compute instances as nodes of a packet processing cluster designated to perform the requested operations. The control-plane component provides metadata to the client, to be used to establish connectivity between the cluster and one or more sources of the traffic whose packets are to be processed.

19 Claims, 9 Drawing Sheets

(56) References Cited

U.S. PATENT DOCUMENTS

| | | | |
|---|---|---|---|
| 2013/0250799 A1* | 9/2013 | Ishii | H04L 47/12 370/252 |
| 2013/0301652 A1* | 11/2013 | Oz | H04L 67/10 370/468 |
| 2014/0157274 A1* | 6/2014 | Ballani | H04L 67/101 718/1 |
| 2014/0344440 A1* | 11/2014 | Dutta | H04L 41/0823 709/224 |

* cited by examiner

SCALABLE PACKET PROCESSING SERVICE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers.

A number of applications that are run in such networked environments may require high-performance processing or analysis of network packets, e.g., to detect possible intrusions or attacks, perform various types of address translations, implement encapsulation protocols, enforce firewall rules and the like. Traditionally, many such sub-application-layer packet processing tasks (which may also be referred to as network processing tasks) have been performed using expensive customized hardware devices or appliances. In some cases, such hardware devices may implement special instruction sets designed specifically for packet analysis and transformations, and may not be usable for other purposes. Some special-purpose packet processing appliances may have to be placed in close physical proximity to network components, which may present substantial logistical problems in large networks.

As more and more applications are moved to distributed or networked environments, and as the workload levels that have to be sustained by the applications increase, the demand for efficient packet processing increases as well. Acquiring a sufficient number of expensive custom packet processing devices and deploying them across numerous data centers may become unsustainable for at least some application owners. Many application owners have migrated their applications to inexpensive cloud computing environments, and deploying and maintaining inflexible specialized network processing hardware may become impractical for the cloud computing providers as well.

Figure 1:
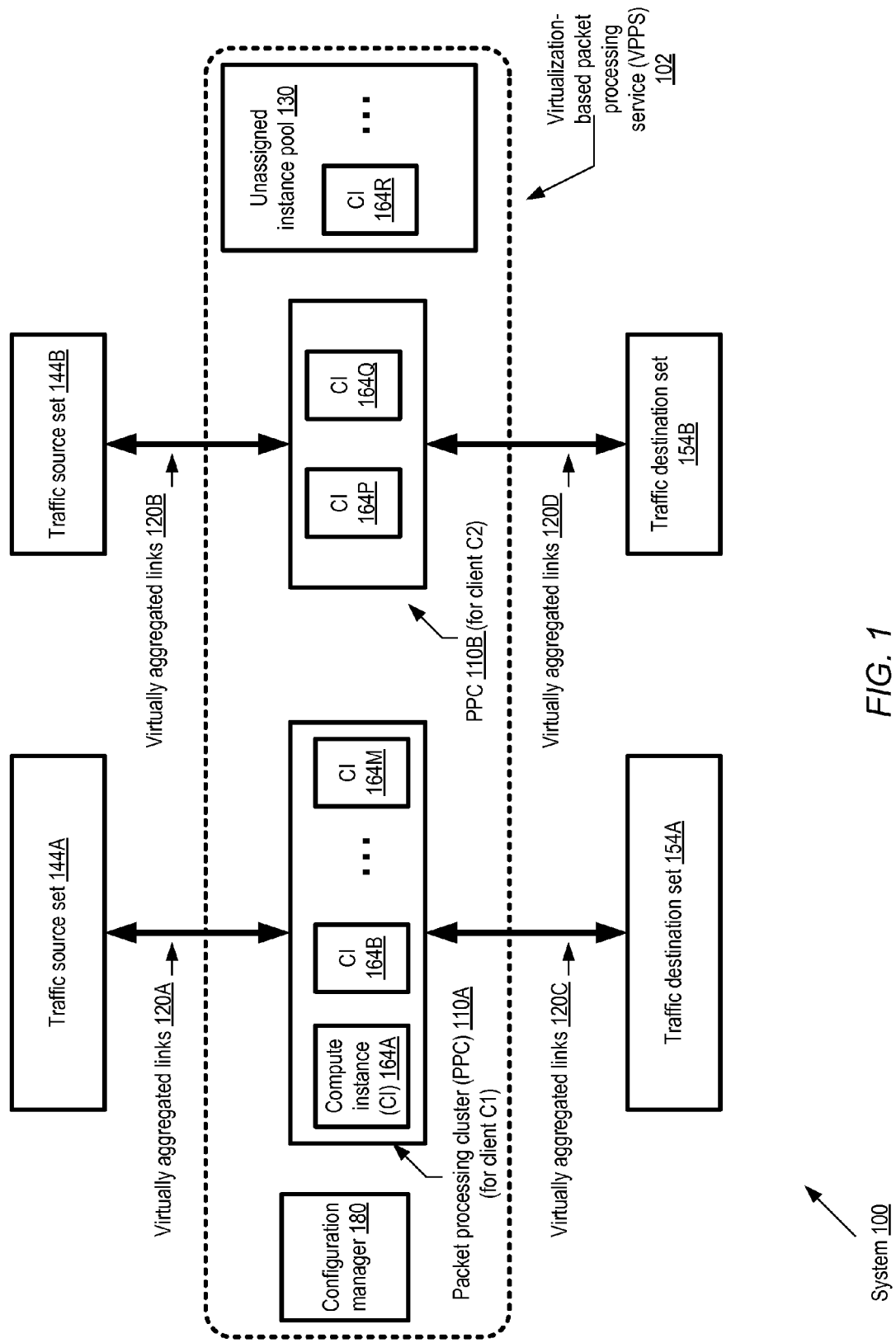
FIG. 1 illustrates an example system environment in which a configuration manager of a virtualization-based packet processing service (VPPS) may establish packet processing clusters (PPCs) whose nodes comprise compute instances, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing scalable packet processing (e.g., at layers below the application layer of commonly-used networking protocols) using virtualized compute servers at a provider network are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. At least some provider networks may also be referred to as "public cloud" environments. A given provider network may include numerous data centers hosting various resource pools, such as collections of physical and/or virtualized compute servers, storage devices, networking equipment and the like, needed to implement, configure and distribute the infrastructure and services offered by the provider. In at least some embodiments, a virtual computing service implemented at a provider network may enable clients to utilize one or more guest virtual machines (which may be referred to herein as "virtualized compute servers", "compute instances" or simply as "instances") for their applications, with one or more compute instances being executed on an instance host of a large fleet of instance hosts. Several different kinds of instances may be supported in some implementations, e.g., "large", "medium" or "small" instances that have different compute performance capabilities, different memory sizes and different amounts of persistent storage space. Within large provider networks, some data centers may be located in different cities, states or countries than others, and in some embodiments the resources allocated to a given application may be distributed among several such locations to achieve desired levels of availability, fault-resilience and performance.

In at least some provider networks, a variety of higher-level services may be implemented by the provider network operator (or by customers of the provider network) using resources of other services; for example, a database service may utilize a storage service and the virtual computing service. According to some embodiments, a virtualization-based packet processing service (VPPS) may be implemented, in which respective clusters of compute instances running on instance hosts of the virtual computing service may be set up to perform client-requested packet processing operations. Such a service may also be referred to herein as a "virtualized packet processing service". For example, a client of the virtual computing service may have established an isolated virtual network to run an e-commerce application that is to be accessed by end-users on the public Internet, and may wish to employ various types of intrusion detection mechanism that require very efficient analysis of incoming packets. A VPPS may enable such a client to implement the desired intrusion detection operations in a user-friendly, inexpensive manner using some subset of a fleet of compute instances maintained by the VPPS in some embodiments as described below, and may also add or reduce the number of packet processing compute instances deployed based on changing needs of the client. Virtualization-based packet processing may be employed in the context of a variety of different networking protocols in different embodiments, including for example protocols of the Internet Protocol (IP) family such as TCP (Transmission Control Protocol), UDP (User Datagram Protocol), proprietary protocols implemented within provider networks, and so on.

In some embodiments, a VPPS may, for example implement easy-to-use programmatic interfaces (e.g., web-based consoles, application programming interfaces, command-line tools or standalone GUIs) that can be used by clients to indicate their packet processing requirements. Using such an interface, a client may indicate performance, availability and/or other requirements associated with various types of packet processing—for example, the client may request a packet processing infrastructure that can handle up to X gigabits of traffic per second, with no more than Y milliseconds of added latency per packet, and a maximum downtime of Z minutes a year. In at least some embodiments, the requested packet processing may be performed at one or more sub-application layers (e.g., at the link layer, the Internet layer or the transport layer of the Internet protocol suite, or the corresponding layers of other protocol suites). In other embodiments, application-layer processing may also or instead be performed. The types of packet processing desired may be indicated programmatically, e.g., using a rules descriptor that indicates which subsets of packets are to be selected for analysis (or that all packets are to be selected), and the kinds of operations that are to be performed on the packets. It is noted that in various embodiments, a variety of internal and external customers may utilize the VPPS—e.g., virtualization-based packet processing may be performed for other services of the provider network, or for entities (such as individual or organizations) outside the provider network, including users of other services implemented at the provider network.

In response to determining the packet processing requirements for a given client, in one embodiment, a configuration manager (or some other administrative or control-plane component) of the VPPS may first verify that the type of processing being requested is supported by the service. For example, in at least some embodiments, a discrete set of different types of packet processing may be supported by the VPPS, e.g., using respective components or modules of a library that is installable on the compute instances to be used as packet processing engines. In one embodiment, the VPPS may also provide programmatic interfaces enabling clients to register new types of packet processing modules, so that the set of supported packet processing techniques may be enlarged over time.

If the configuration manager determines that the requested processing operations are supported, a set of compute instances executing at one or more instance hosts may be assigned or designated as member nodes of a packet processing cluster (PPC) in some embodiments. In some implementations, the VPPS may maintain a pool of compute instances that can be deployed quickly, so that it takes very little time (e.g., a few seconds or tens of seconds) to configure a PPC. In other implementations, one or more of the instances may be launched or started up after the client's request is received. Each instance that is assigned to the PPC may comprise a packet processing module capable of performing at least the kinds of analysis and/or transformation operations requested by the client. Collectively, a large enough set of compute instances may be provisioned for the PPC to meet the performance requirements of the client, and the instances may be configured (e.g., as members of failover groups described below) to meet the desired availability requirements. Thus, the number of instances and the types of instances (e.g., "large" vs. "small" instances as defined by the virtual computing service) selected for the cluster may be determined at least in part on the requirements indicated by the client.

An identifier generated by the configuration manager (or, in some implementations, specifically requested by the client) may be assigned to the PPC, and metadata indicative of the configuration details of the PPC (e.g., the specific instances used, the requirements used to select the instances, and the like) may be stored in a VPPS repository. Metadata that can be used by the client to establish connectivity between a set of traffic sources (on whose packets the requested operations are to be performed at the PPC nodes) and the PPC may be provided programmatically to the client in at least some embodiments. Such metadata may, for example, include the identifier of the PPC, an alias that can be used to refer to the PPC, or one or more network addresses, for example. In one implementation, the client may specify a particular network address to be assigned to the PPC, e.g., in the request comprising the requirements, or in a later programmatic interaction with the configuration manager. If such an address is received at the configuration manager, the requisite networking performance changes (e.g., settings changes at virtual and/or physical network interfaces attached to the PPC nodes) may be initiated by the configuration manager. In one embodiment, after the client receives the metadata (such as an identifier of the PPC), the client may add one or more entries in route tables to indicate that the PPC is to be the target for certain types of traffic.

The configuration manager may activate the packet processing modules in some embodiments (e.g., by launching respective processes for each of the modules, which may then wait to receive packets to be processed), enabling the requested processing operations to begin as soon as the traffic sources begin transmitting their packets. The configuration manager may monitor various aspects of the PPC node behavior and performance, e.g., to ensure that any given node is not becoming a bottleneck and to compare the measured packet processing performance against the targeted performance metrics. Health monitoring checks may also be conducted by the configuration manager in some cases, e.g., either using its own custom health checking mechanism or utilizing a more general purpose health monitoring infrastructure already available in the provider network. If a given PPC node fails or becomes overloaded, at least a part of its workload may be transitioned to a different PPC node. Based on various triggering conditions, the configuration manager may determine that the number of nodes in the PPC should be altered, and may either add or remove nodes as appropriate. Such cluster population changes may be made, for example, in response to an explicit performance requirement change indicated programmatically by the client, or upon determining that the number of compute instances currently assigned to the PPC is insufficient to achieve the performance requirement. In some cases, a determination that the combined resource capacity of the compute instances assigned to the PPC exceeds a resource capacity required to achieve the performance requirement may result in a reduction in the number of instances assigned. It may the case that the measured rate of traffic is lower than that indicated by the client, and if a sustained discrepancy between the anticipated and actual rate is detected, in some embodiments the configuration manager may add or remove instances from the PPC. In other embodiments, regardless of the actual rate, the configuration manager may retain as many compute instances in the PPC as needed for the client's target performance goals. In at least some embodiments, some or all of the compute instances that are designated as members of the PPC may generate log records related to the packet processing operations performed at the compute instances, and such log records may be used by the configuration manager to determine whether the PPC's resources need to be modified. For example, such log records may be examined to determine the response times for various packet processing operations, the measured throughput of packet processing operations, and so on, and such metrics may influence the configuration manager's decisions. The PPC may continue in operation for extended periods (e.g., weeks, months or even years) in some embodiments, with the number of nodes being adjusted on demand or based on monitoring results, until eventually a request to tear down the PPC is received.

As mentioned above, a wide variety of packet processing operations may be supported in various embodiments. These may include, for example, firewall operations, any of several varieties of intrusion detection operations, network address translation (NAT) operations, protocol-dependent encapsulation operations, load balancing or load limiting operations, or operations to implement a caching proxy. In some embodiments, respective software modules capable of implementing each of the supported types of packet processing may be loaded/installed onto each of the PPC nodes, e.g., by default or as needed. In other embodiments, several different types of packet processing operations may be supported by a single module at the compute instance.

In at least some embodiments, and depending on the specific requirements of the client, a distributed data store (such as a key-value store) may be set up for each PPC (or shared among several PPCs), accessible to the various member nodes of the PPC. Such a data store may be used for storing the packet processing rules being implemented (e.g., metadata indicating which specific packets are to be processed, and how they are to be processed), for example, so that as new compute instances are added to the PPC they can access the rules from the data store. In some embodiments, such a data store may also or instead be used to store state information for stateful packet processing operations, e.g., so that in the event one node of the PPC fails, a replacement node can take over at least some of the failed node's workload. The distributed data store may include, for example, an in-memory database, a relational database, a non-relational database, or a set of storage objects of a storage service implemented at the provider network. In some embodiments, the data store may include a persistent remote data repository as well as caches at each of the PPC nodes.

In at least some embodiments, the virtual computing service may enable the attachment of one or more "virtual network interfaces" (which may also be referred to as "elastic network interfaces") with each compute instance. Such virtual network interfaces may be assigned one or more network addresses and various security-related attributes, and may be transferable between instances. For example, a particular virtual network interface VNI1 attached to a given instance I1 may be assigned a particular IP address IPAddr1, and that address may then be transferred to a different instance I2 by detaching VNI1 from I1 and attaching VNI1 to I2. Virtual network interfaces may thus represent dynamically transferable associations of specified networking properties with compute instances. In some embodiments, virtual link aggregation may be used for the PPCs. That is, a plurality of virtual network interfaces (e.g., one for each of the PPC nodes) may be configured in such a way that the incoming traffic, which may be directed to a single network address associated with the PPC, may be distributed (e.g., based on hashing the packet headers) among the plurality of virtual network interfaces, and hence among the different PPC nodes. Such logically-coupled or unified virtual network interfaces may also be referred to as "trunked" virtual network interfaces in some embodiments. In one embodiment, physical link aggregation may be used instead of or in addition to virtual link aggregation.

In some embodiments, the results of the packet processing operations (e.g., analyzed or transformed packets) may be transmitted to the original destinations indicated in the un-processed packets received by the PPC, such that the use of the PPC as an intermediary is not apparent at the destinations. Of course, depending on the kind of packet processing being performed, not all of the packets received at the PPC may result in a corresponding packet being received at the destination(s)—for example, if the PPC determines that an incoming packet is part of a network intrusion or if the packet is to be blocked based on a specified firewall rule, the packets may be dropped by the PPC nodes that analyze them.

A number of components of the provider network may be adapted to utilize PPCs in various embodiments. For example, in one embodiment, edge nodes of the provider network, such as gateways or routers that receive incoming traffic from external networks and/or transmit outgoing traffic to external networks may include VPPS-aware modules that can distribute packets of traffic among the different nodes of a PPC. In another embodiment, in which for example the sources of the network traffic comprise other compute instances, a virtualization management component at the instance hosts at which the traffic originates may be VPPS-aware, and may distribute outgoing packets among the nodes of the PPCs using hashing or other distribution approaches.

Example System Environment

FIG. 1 illustrates an example system environment in which a configuration manager of a virtualization-based packet processing service (VPPS) may establish packet processing clusters (PPCs) whose nodes comprise compute instances, according to at least some embodiments. As shown, system 100 comprises a number of constituent elements of a virtualization-based packet processing service 102. These elements may include a configuration manager 180 and a plurality of packet processing clusters (PPCs) 110 such as PPC 110A set up for client C1 and PPC 110B established for client C2. Each PPC may include one or more compute instances (CIs) 164, such as CI 164A, 164B and 164M in PPC 110A, and CIs 164P and 164Q in PPC 110B. Each of the compute instances 164 may comprise a respective guest virtual machine running at an instance host of a virtual computing service implemented at a provider network. The manner in which the CIs are distributed among the instance hosts may differ in various embodiments. For example, in some embodiments in which a single-tenant approach to packet processing is implemented, multiple CIs of a given PPC may be instantiated at a given instance host, but CIs from two different PPCs may not be instantiated at any single instance host. In other embodiments, a multi-tenant approach may be used, in which compute instances of two or more different PPCs 110 may be set up on the same instance host. In one embodiment, only a single compute instance 164 used for packet processing may be instantiated at a given instance host Each PPC may be used for traffic flowing between a particular traffic source set 144 and a traffic destination set 154 in the depicted embodiment. PPC 110A may be responsible for performing packet processing operations for client C1 on at least a subset of the packets generated at source set 144A and directed to destination set 154A, for example, while PPC 110B may be responsible for performing packet processing for client C2 on at least a subset of packets originating at source set 144B and directed to destination set 154B. In some embodiments, the packet processing rules indicated by a client may apply to traffic in either direction between specified sets of network endpoints or addresses—that is, the endpoints at which the packets that are analyzed and/or transformed by the PPC may be considered sources for some portions of the traffic processed at the PPC, and destinations for other portions of the traffic. In some embodiments, multiple PPCs may be established on behalf of the same client, e.g., for performing different kinds of network processing operations on different sets of traffic, either between the same sets of source/destination endpoints or between different source/destination sets.

In at least one embodiment, a client may submit a packet processing request to the configuration manager 180 of the VPPS 102, indicating for example a set of performance and/or other goals or requirements for a set of packet processing tasks, as well as rules defining the tasks themselves. A given rule may indicate, for example, a selection policy that can be used to decide whether a given packet is to be processed, and analysis or transformation operations to be performed on such selected packets. In at least one implementation, the rules may be specified using an industry standard language such as Python, JSON (JavaScript Object Notation), Ruby, XML (Extensible Markup Language), Perl or the like, and a set of files or scripts corresponding to the rules may be provided as a parameter of the packet processing request. Packet processing requests may also be referred to herein as PPC setup requests. In at least some embodiments, upon receiving such a request, the configuration manager may parse the rule(s) to verify that the requested types of packet processing operations are among a supported set of processing techniques. Requests for unsupported processing types may be rejected.

For requests that can be accommodated at the service, the configuration manager 180 may identify a set of CIs (e.g., selected from a pool 130 of unassigned compute instances) to a corresponding PPC in the depicted embodiment. In at least some embodiments, the configuration manager 180 may instantiate at least two instances (such as CIs 164P and 164Q of PPC 110B) by default for any given PPC, e.g., so that one of the CIs may take over the packet processing workload of the other in the event of a failure. In other embodiments, a PPC may not be required to have at least two CIs.

As shown in FIG. 1, the network links between the traffic sources and the PPCs, as well the network links between the PPCs and the destinations, may be virtually or logically aggregated in at least some embodiments. For example, even though multiple virtual network interfaces may be assigned to a given PPC 110 (e.g., one or more virtual network interfaces attached per CI 164), such interfaces may be "trunked" or made to appear as a single interface to the entities with which the PPC communicates. Thus, traffic may flow over virtually aggregated links 120A between source set 144A and the PPC 110A, and over virtually aggregated links 120C between PPC 110A and destination set 154A. Similarly, virtually aggregated links 144B and 144D may be used for PPC 110B in the depicted embodiment. In some embodiments, the inbound and outbound links of a PPC may be physically aggregated, e.g., in accordance with various IEEE (Institute of Electrical and Electronics Engineers) link aggregation standards/protocols such as LACP (Link Aggregation Control Protocol).

In at least some embodiments, not all the configuration settings required to connect a given PPC 110 with a given source set 144 and or/a given destination set 154 may be put into effect at the time that the PPC is created by the service. Thus, it may be possible for the configuration manager 180 to create a PPC (e.g., to store at least some of the metadata representing a PPC in a metadata store of the VPPS) without necessarily establishing connectivity between the PPC and the sources/destinations of the traffic to be processed. The configuration manager may instead provide metadata that can be used for establishing connectivity later, e.g., at a time of the client's choosing, to the client on whose behalf the PPC is set up in such embodiments. Such connectivity-related metadata may, for example, include a unique identifier or alias of the PPC, or a network address assigned to the PPC. In at least some embodiments, clients may indicate the network address (or addresses) to be assigned to a PPC, e.g., either as a parameter of the packet processing request or in a subsequent programmatic interaction with the configuration manager.

In one embodiment, e.g., after a client has been informed that a PPC has been created and/or connectivity has been established with the traffic sources and destinations, the configuration manager 180 may activate the PPC. Activation may include, for example, starting up respective packet processing modules or processes at the CIs of the PPC so that the processing operations requested by the client can be performed. In other embodiments, clients may activate the PPC instead of or in addition to the configuration manager. In one embodiment, no explicit activation may be required—that is, as soon as a PPC CI is booted up, its packet processing modules may begin performing the requested types of processing operations. A given PPC may remain active for as long as a client wishes to utilize it in some embodiments, e.g., until the client submits a teardown request for the PPC 110. Based on various triggering conditions as described below, the number and/or types of compute instances 164 deployed as nodes of a PPC may be modified during the PPC's lifetime—e.g., in response to a change in the client's performance goals, or in response to an analysis of performance metrics obtained by the configuration manager.

In at least one embodiment, a data store may be instantiated for storing PPC metadata (e.g., the rules that the CIs of the PPC are to implement) and/or for storing state information for various packet processing tasks as described below. Such state information may, for example, be used by a particular CI 164 that is designated to assume at least a portion of the workload of another CI in the event of a failure or a workload increase.

Traffic Sources for Virtualization-Based Packet Processing

Figure 2:
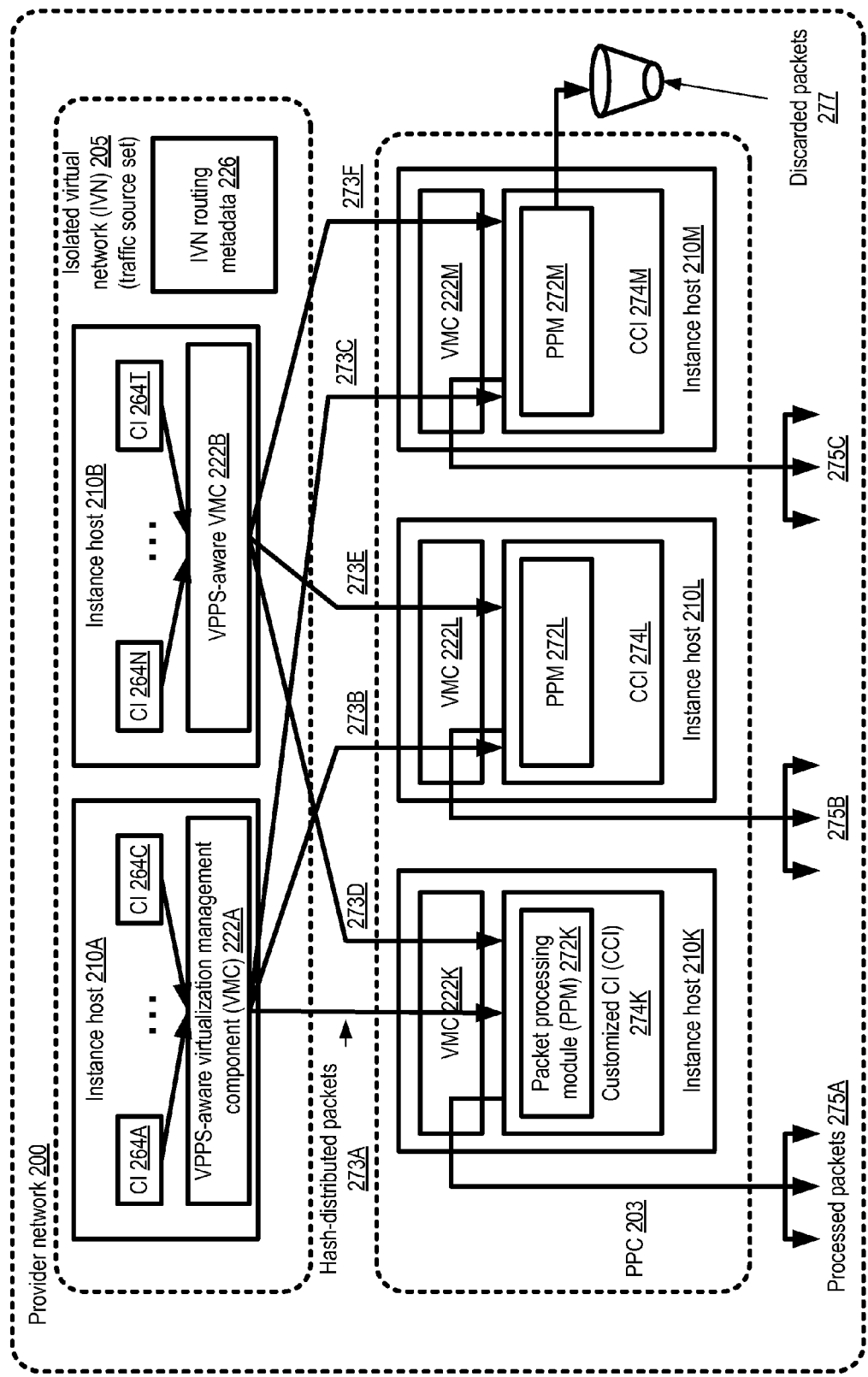
FIG. 2 illustrates an example of a provider network in which virtualization management components at instance hosts of an isolated virtual network (IVN) may distribute outgoing packets among the nodes of a PPC, according to at least some embodiments.

In at least some embodiments, PPCs may be set up for processing packets that originate at compute instances (which may be termed "source" compute instances) within the provider network. In one such embodiment, the virtualization management software installed at the instance hosts at which the source compute instances run may comprise VPPS-aware modules that can direct outgoing packets to the appropriate PPC nodes. FIG. 2 illustrates an example of a provider network in which virtualization management components at instance hosts of an isolated virtual network (IVN) may distribute outgoing packets among the nodes of a PPC, according to at least some embodiments.

In at least some embodiments, a provider network may enable customers to request the establishment of "isolated virtual networks" (IVNs) at the provider's data centers. An IVN (which may also be referred to in some environments as a "virtual private cloud" or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources such as various compute instances, manage the creation of subnets within the IVN, and the configuration of route tables etc. for the IVN. For at least some of the devices within an IVN in some embodiments, the IP addresses may not be visible outside the IVN, at least by default. Such IP addresses may be referred to herein as "private" IP addresses, in contrast to "public" IP addresses that are accessible from the public Internet as a result of being directly or indirectly advertised on the public Internet via BGP (the Border Gateway Protocol) or other similar protocols.

In provider network 200 of FIG. 2, IVN 205 comprises a plurality of compute instances 264, including CIs 264A-264C executing on instance host 210A, and CIs 264N-264T on instance host 210B. Each instance host 210 may comprise a respective virtualization management component (VMC) 222, such as a hypervisor and/or an administrative instance of an operating system running in a privileged domain that is sometimes referred to as dom-0 (domain zero). The VMCs 222 at the instance hosts 210 may serve as intermediaries between the CIs 264 and hardware devices such as (physical) network interface cards, disk drives, and the like. For example, TCP packets or UDP packets directed to various destinations from the compute instances 264A-264C may be intercepted at VMC 222A before they are transmitted out of the instance host 210A. In various embodiments, the VMCs 222 may be configured to encapsulate baseline packets produced at the compute instances 264 and direct the resulting encapsulation packets along the appropriate physical links towards the intended destinations indicated in the baseline packets.

Various aspects of the networking configuration pertinent to the IVN 205, such as the private and/or public IP addresses assigned to the CIs 264 and the subnets configured within the IVN 205 may be determined by the client on whose behalf the IVN was set up (e.g., as opposed to the provider network operator). In the depicted embodiment, the client may have requested the creation of a PPC 203 for performing specified types of packet processing operations on packets originating within IVN 205. PPC 203 may comprise customized CIs (CCIs) 274K-274M in the depicted example, each of which is instantiated at a respective instance host 210K-210M with its own VMC (e.g., VMCs 222K-222M). The CCIs 274 may differ from the IVN's CIs 264 in the illustrated embodiment, in that, for example, each CCI may include a respective packet processing module 272 (e.g., PPMs 272K-272M at CCIs 272K-272M respectively) while the IVN CIs may not necessarily include such PPMs.

The IVN's routing metadata 226 may include an indication of the PPC 203 (e.g., a route table entry, set up by the client, which identifies the PPC 203 as a destination for a subset of outgoing traffic). The VMCs 222A and 222B may be VPPS-aware in the depicted embodiment—that is, they may be able to determine, using IVN routing metadata 226, that at least some of the baseline packets generated at instances 264 are to be directed to the PPC. In at least one embodiment, a hash function may be used by the VMCs 222 to direct such outgoing packets to specific nodes of the PPC 203. As indicated by arrows 273A, 273B and 273C, respective subsets of packets originating at CIs 264A-264C may be directed to CCIs 274K, 274L and 274M by VMC 222A. Similarly, as indicated by arrows 273D, 273E and 273F, respective subsets of packets originating at CIs 264N-264T may be directed to CCIs 274K, 274L and 274M by VMC 222B of instance host 210B. The respective VMCs 222 at the instance hosts 210K-210M may serve as intermediaries between hardware components (such as physical network interface cards) and the CCIs 274 with respect to both incoming packets and outgoing packets. The appropriate packet processing may be performed at the PPMs 272 in accordance with the rules associated with PPC 203.

Depending on the nature of packet processing requested by the client, some processed packets 275A, 275B and 275C may be transmitted on towards the destinations indicated in the packets generated at CIs 264 in the depicted embodiment. Some types of packet processing (such as firewall-related processing or intrusion/malware detection processing) may result in one or more incoming packets being dropped instead of being sent towards their original destinations, as indicated by the bucket labeled discarded packets 277 in FIG. 2.

In the embodiment illustrated in FIG. 2, the packets on which specified processing operations are performed at the CCIs of a PPC originated at compute instances within an IVN of a provider network. In general, the packets to be processed may originate at any set of network endpoints, either within or outside the provider network. In some cases, for example, the packets may originate at resources being used to implement other services of the provider network, at compute instances that are not part of an IVN, at client-owned premises outside the provider network, or at devices of external networks such as the Internet.

Figure 3:
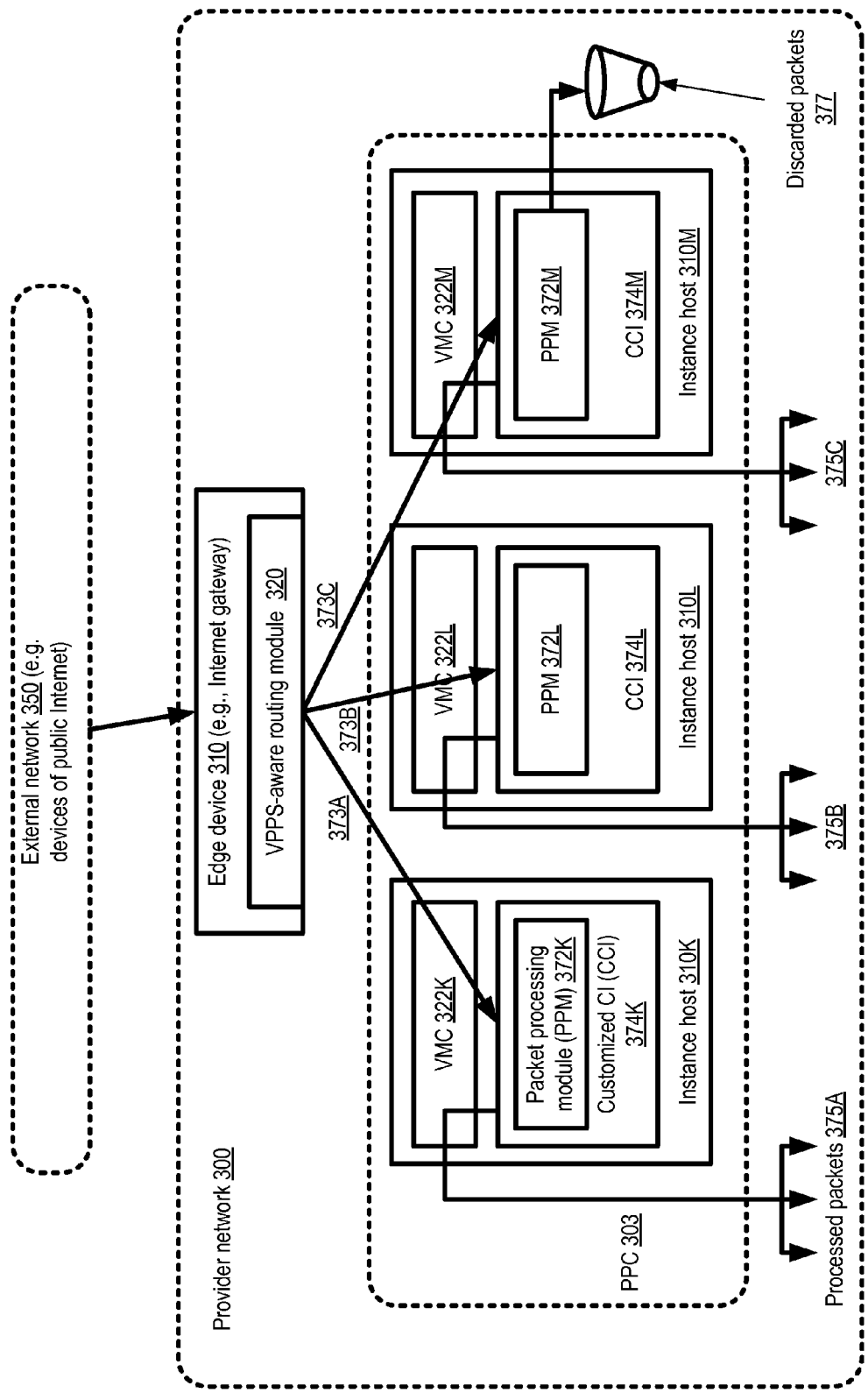
FIG. 3 illustrates an example edge device of a provider network that may distribute packets received from external networks among the nodes of a PPC, according to at least some embodiments.

FIG. 3 illustrates an example edge device of a provider network that may distribute packets received from external networks among the nodes of a PPC, according to at least some embodiments. A client may, for example, have set up a publicly-accessible application using one or more services of provider network 200, such as a virtual computing service, a database service or a storage service in the depicted embodiment. The client may wish to have specified types of packet processing (such as intrusion detection) performed on traffic originating from outside the provider network and intended to reach the client's application. Accordingly, the client may request the establishment of a PPC 303, comprising some number of CCIs 374 (such as CCIs 374K-374M instantiated at hosts 310K-310L respectively). Each CCI 374 may include a respective PPM 372 (e.g., PPMs 372K-372M at CCIs 374K-374M) capable of performing the types of packet processing required by the client. The processing operations may be performed on packets that are received at instance hosts 310 and transferred to the CCIs via the instance host's VMC 322 (e.g., VMC 322K, 322L or 322M).

Packets originating at devices within external network 350 (e.g., Internet-connected devices such as cellular phones, tablets, laptop computers and the like) may be received at one or more edge devices 310 (such as gateways, edge routers, switches and the like) of the provider network. In the depicted embodiment, such an edge device 310 may comprise a VPPS-aware routing module 320 that intercepts incoming packets and directs them towards the appropriate CCI 374 of the PPC. In at least some embodiments, when selecting the destinations for the intercepted packets, the VPPS-aware routing module at an edge device 310 may use route table entries designating the PPC as a destination for certain types of traffic. From the PPC nodes, depending on the kind of packet processing operations being performed, some set of processing results 375 (e.g., 375A, 375B or 375C) may be forwarded on to the destinations indicated in the incoming packets, while some subset of the packets 377 may be discarded.

In some embodiments, the configuration manager of the VPPS may propagate PPC metadata to the edge devices 310 (and/or to various VMCs 222 of instance hosts that have been configured for VPPS support, such as instance hosts 210A and 210B of FIG. 2) to enable VPPS-aware modules at those devices to distribute packets appropriately (e.g., by setting up appropriate route table entries). The propagated metadata may, for example, include mappings between PPC names/aliases and a set of network addresses (assigned to member nodes of the PPC) among which traffic directed to the PPC is to be distributed, hash functions that take one or more header values of an (un-processed) packet as input and determine which specific PPC network address should be selected for that packet, and so on. In some embodiments, other devices within the provider network (e.g., internal routers, gateways and the like between logically-separate portions of the provider network) may also comprise VPPS-aware modules. In at least one embodiment, not all the instance hosts of the virtual computing service, and not all the edge nodes of the provider network, may necessarily be VPPS-aware. In the latter scenario, in which a subset of the instance hosts is configured to support packet distribution among PPC nodes, the virtual computing service may have to ascertain, before allocating an instance to a client, whether the client wishes to utilize VPPS capabilities. If the client does wish to use VPPS functions, an instance host with a VPPS-aware VMC may be selected for the instance.

Data Stores for PPC Metadata

Figure 4:
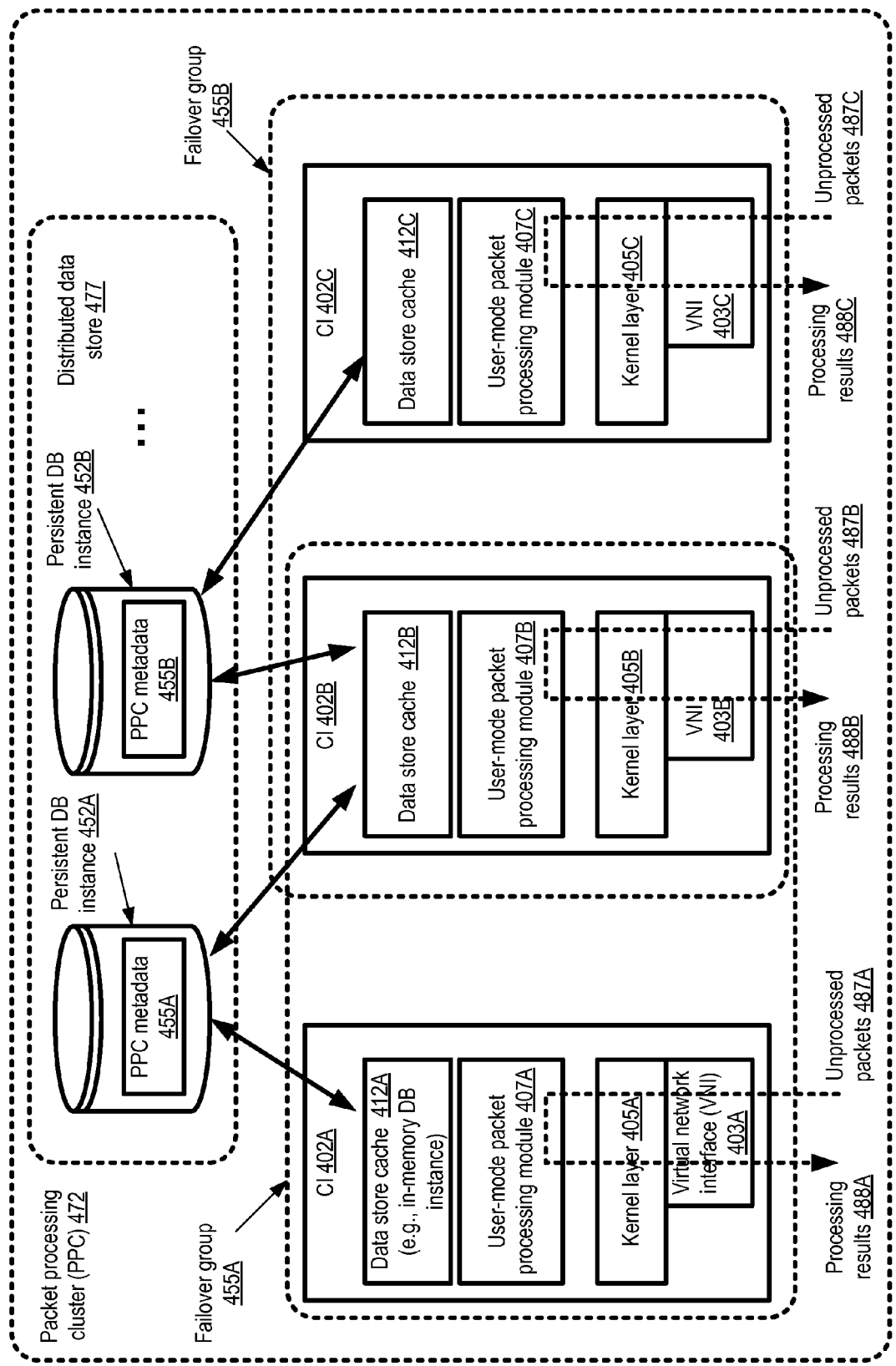
FIG. 4 illustrates an example of a distributed data store that may be used to store metadata pertaining to a PPC, according to at least some embodiments.

In some embodiments, for one or more types of packet processing operations, a data store accessible from the PPC nodes may be set up by the configuration manager, e.g., as part of the process of establishing the PPC. FIG. 4 illustrates an example of a distributed data store 477 that may be used to store metadata pertaining to a PPC 472, according to at least some embodiments. PPC 472 comprises three compute instances 402A, 402B and 402C in the depicted example, each of which has access to the distributed data store 477. In the depicted embodiment, at least two kinds of metadata may be stored in the distributed data store 477: definitional metadata indicative of the packet processing rules that are being implemented using the PPC, and packet processing state information that can potentially be used by one member node of the PPC to take over at least some of the responsibilities of another node.

In the depicted embodiment, distributed data store 477 may comprise a persistent layer (e.g., comprising persistent database instances 452A and 452B, respectively storing metadata sets 455A and 455B) that may be implemented on computing devices separate from the instance hosts at which the PPC nodes 402 are instantiated. For example, a relational database service or a non-relational database service implemented at the provider network may be used for the persistent layer. In at least some embodiments, a respective cache of at least a portion of the PPC metadata 455 may be stored at each of the compute instances 402—e.g., cache 412A at CI 402A, cache 412B at CI 402B, and cache 412C at CI 402C. In some implementations, an in-memory database implemented using an in-memory database service of the provider network may be used as the cache. In at least one embodiment, the distributed data store may comprise only a persistent layer, or only a local in-memory store at the various CIs—that is, a multi-layer data store implementation such as that illustrated in FIG. 4 may not be required. In some embodiments, the distributed data store may comprise some number of replicas of the metadata—e.g., metadata portion 455A may be a copy of metadata portion 455B.

At least some compute instances of a PPC 472 may be configured as members of failover groups in some embodiments. In the example shown in FIG. 4, CIs 402A and 402B are members of failover group 455A, for example, while CIs 402B and 402C are members of failover group 455B. Detection of a failure of one member of a failover group 455 (e.g., by the configuration manager of the VPPS, or by a health monitoring service utilized by the VPPS) may lead to a transfer of packet processing responsibilities from the failed node to a different member of the failover group. Thus, for example, if CI 402A fails, CI 402B may be responsible for assuming or taking up at least some of CI 402A's workload for at least some time. As shown, a given CI may be a member of several different failover groups in some implementations; in other implementations, a given CI may only be assigned to a single failover group at one time. To facilitate the transfer of workload, at least some state information regarding stateful packet processing operations may be stored in the distributed data store 477 by the compute instances of the PPC. Such storage of information at the data store 477 for failover purposes may not be required for stateless packet processing operations.

Metadata 455 may also or instead include an indication of the rules that govern the packet processing being performed in some embodiments—e.g., the selection policies for packets to be processed, the transformations or analysis procedures to be used, and so on. Such metadata may be referred to herein as definitional metadata, e.g., to distinguish it from the state metadata discussed above. Definitional metadata may include PPC workload distribution rules in some embodiments—e.g., how the particular compute instance 402 that is to handle a given packet should be selected, under what circumstances a given CI is to be considered overloaded, and so on. In at least some embodiments, the configuration manager of the VPPS may assign additional CIs 402 to a given PPC 472, and the newly assigned CIs may access the data store 477 to determine the details of the packet processing that they are to perform.

In the example depicted in FIG. 4, each CI is shown with a respective kernel layer 405 and a respective user-mode packet processing module 407. Thus, CI 402A comprises kernel layer 405A that manages low-level networking operations associated with an attached virtual network interface (VNI 403A), CI 402B's kernel layer 405B handles low-level operations associated with VNI 403B, and CI 403C's kernel layer 405C handles low-level operations of VNI 403C. Incoming un-processed packets 487 flow in via the VNIs 403, and are transferred to the user-mode packet processing modules 407 by the kernel layers 405. Results 488 of the packet processing (unless the packets are discarded as a consequence of the processing) are generated at the user-mode packet processing modules 407 at each of the CIs 402, and passed to the kernel layers 405 on their way to their destinations. Depending on the nature of the packet processing being performed, the destinations of the packets may be changed by the user-mode modules 407 in some embodiments. Although user-mode packet processing modules are shown in the embodiment illustrated in FIG. 4, in other embodiments at least some of the packet processing may be performed at kernel-layer modules of the compute instances 402.

Configuration Manager Subcomponents

Figure 5:
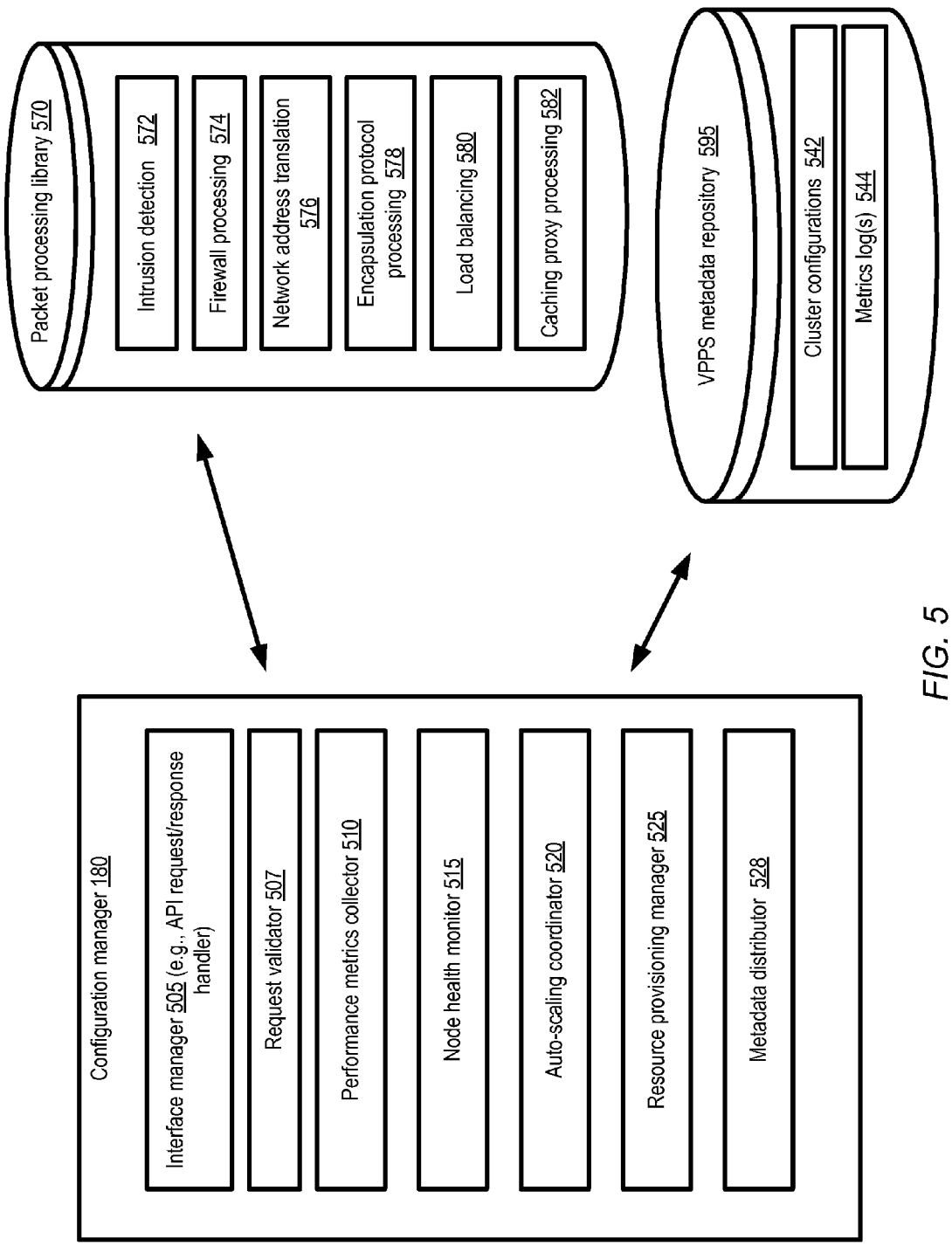
FIG. 5 illustrates example subcomponents of a configuration manager of a VPPS, according to at least some embodiments.

FIG. 5 illustrates example subcomponents of a configuration manager 180 of a VPPS, according to at least some embodiments. The configuration manager may include an interface manager 505, a request validator 507, a performance metrics collector 510, a node health monitor 515, an auto-scaling coordinator 520, a resource provisioning manager 525, and a metadata distributor 528 in the depicted embodiment. In at least some embodiments, the configuration manager 180 may utilize several different collaborating software and/or hardware elements—e.g., one or more of the subcomponents shown in FIG. 5 may be implemented at a different set of computing devices than another subcomponent. The configuration manager 180 may be considered a control-plane or administrative component of the VPPS in the depicted embodiment, as opposed to PPC nodes which may be regarded as data-plane or non-administrative components.

The interface manager 505 may be responsible for handling client requests and transmitting responses to the clients in the depicted embodiment. In at least some embodiments, one or more programmatic interfaces may be implemented for control-plane (administrative) operations of the VPPS, such as a set of APIs, a web-based console, a command-line tool, or a standalone GUI (graphical user interface). A number of different types of configuration-related requests may be submitted by clients using such interfaces, such as requests to establish PPCs, modify PPC requirements, and so on as described in greater detail below with reference to FIG. 6. The interface manager 505 may receive the API requests and transmit corresponding internal requests to other subcomponents of the configuration manager 180 in some embodiments. The other subcomponents may generate internal responses to the requests and provide them to the interface manager for transmission in the appropriate format to the clients.

Request validator 507 may be responsible in the depicted embodiment for determining whether the client's request can be fulfilled by the VPPS. Request validator 507 may parse the request contents, for example, and determine whether the types of packet processing indicated in the request are among a supported set of packet processing types. The VPPS may establish a library 570 of registered or supported packet processing categories in some embodiments, such as one or more techniques for intrusion detection 572, firewall processing 574, network address translation 576, encapsulation protocol processing 578, load balancing 580, and/or caching proxy processing 582. The request validator 507 may consult the library 570 to ensure that the processing tasks requested by the client are feasible. In at least one embodiment, as mentioned earlier, new types of packet processing tasks may be registered in the library 570 at the request of a client, e.g., in a separate request before the client can request the establishment of a PPC to perform the new types of operations.

Performance metrics collector 510 may be responsible for monitoring resource usage within a PPC, e.g., at the compute instances that are the member nodes of the PPC, the instance hosts used for the compute instances, and/or the data store used by the nodes. Records of the collected metrics may be stored in log(s) 544 of VPPS metadata repository 595 in the depicted embodiments, e.g., for later analysis. The VPPS metadata repository 595 also may include PPC configurations 542 (e.g., records indicating the specific compute instances included in various PPCs), definitions of overload conditions for various PPC resources (e.g., maximum permitted CPU utilization at the instances, maximum memory usage levels, and so on) in some embodiments. If overload conditions are detected at one or more CIs or at data store components, the performance metrics collector 510 may notify auto-scaling coordinator 520 to add one or more instances (and/or data store components) to a PPC. Similarly, if the performance metrics collector 510 detects sustained periods of low levels of resource utilization, the auto-scaling coordinator 510 may be notified that a reduction in the PPC's instance population (or a reduction in the resources assigned for the data store) may be beneficial. Node health monitor 515 may be responsible for checking on the responsiveness of the compute instances of various PPCs, and may initiate failovers or workload transfers among PPC nodes in the event a failure is detected. Any of a number of different techniques may be used for monitoring PPC components' health status in different embodiments, including for example the use of heartbeat messages.

Auto-scaling coordinator 520 may be responsible for adding new resources to a PPC, and/or removing resources currently assigned to a PPC, based on various triggering conditions. Such triggering conditions may include, for example, indications (e.g., from the performance metrics collector) that the resources of a PPC are insufficient to meet the requirements for which the PPC was established, or indications that more resources are allocated for a PPC than are required to meet its performance requirements. In some embodiments, a requirements change request from the client may trigger the auto-scaling coordinator 520 to reconsider the set of resources configured for a given PPC. In some embodiments, the auto-scaling coordinator and/or the performance metrics collector may examine contents of packet processing log records generated by PPC nodes to determine whether to add or remove resources. The auto-scaling coordinator may also be responsible for initiating or performing the required networking configuration changes to accompany the resource additions/removals in some embodiments.

In one embodiment, a resource provisioning manager 525 may maintain a pool of compute instances (such as unassigned instance pool 130 shown in FIG. 1) for use by the VPPS. If the number of unassigned instances falls below a threshold, the provisioning manager 525 may be responsible for acquiring additional resources from the virtual computing service of the provider network, for example. Metadata distributor 528 may propagate PPC configuration information to the devices of the provider network where it is required for routing packets—e.g., to various virtualization management components (VMCs) of the instance hosts of the provider network's virtual computing service, to edge networking devices such as Internet gateways, and so on. In at least one implementation, existing services of the provider network may be invoked by the configuration manager for various functions for which subcomponents are shown in FIG. 5, such as performance metrics collection, health monitoring, resource provisioning, auto-scaling, and metadata distribution. It is noted that in various embodiments, some or all of the subcomponents of the configuration manager 180 shown in FIG. 5 may not be implemented, and/or additional subcomponents may be implemented.

Programmatic Interactions

Figure 6:
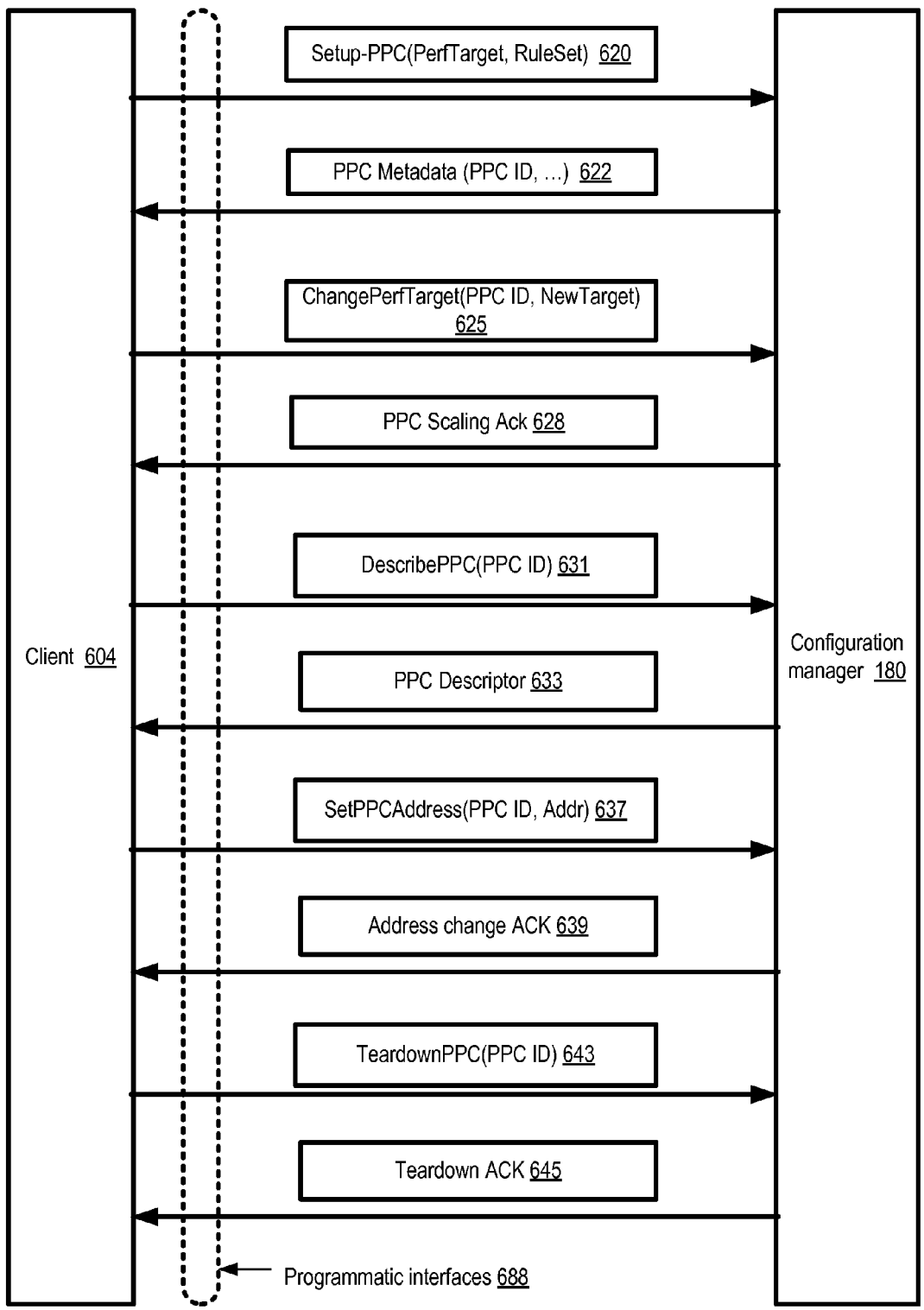
FIG. 6 illustrates examples of programmatic interactions between a client of a VPPS and a configuration manager, according to at least some embodiments.

FIG. 6 illustrates examples of programmatic interactions between a client 604 of a VPPS and a configuration manager 180, according to at least some embodiments. As shown, a set of programmatic interfaces 688 implemented by the VPPS may be used by the client 604 to submit a variety of requests, and to receive response to the requests. As mentioned earlier, any combination of various types of programmatic interfaces may be used in different embodiments, such as APIs, web-based consoles, command-line tools, GUIs, and the like. In a Setup-PPC request 620 submitted via one such interface 688, for example, the client 604 may indicate one or more requirements such as a performance target (PerfTarget) for packet processing, as well as a set of rules (RuleSet) defining the details of the packet processing operations. In some implementations, for example, the rule set may be indicated in one or more files written in a language such as Python, Ruby, JSON, Perl, or the like, combined into a compressed file included as a parameter of the setup request 620. Upon receiving a request 620, as described above, the configuration manager 180 may verify that the types of processing requested are supported, and if so, may initiate the establishment of a PPC configured with a number of nodes (compute instances) that is estimated to be sufficient to meet the performance target. Metadata 622 that can be used to establish connectivity with the PPC (such as a unique identifier or alias of the PPC, or one or more network addresses assigned to the PPC) may be provided to the client. In some embodiments, the Setup-PPC request may include other parameters, such an "auto-scale=true" parameter indicating that the VPPS is permitted to add and remove resources to the PPC based on collected metrics. Constraints (such as a maximum budget limit of the client, or a maximum number of compute instances that can be included in the PPC) may also be indicated in a Setup-PPC request in some embodiments. In one embodiment, the client may also indicate preferences or requirements for a data store to be set up for the PPC, such as the type and/or number of database instances to be set up.

Client 604 may submit a ChangePerfTarget request 625 via the programmatic interfaces 688 in the depicted embodiment, indicating a new performance target for an existing PPC with a specified PPC ID. In response, the configuration manager 180 may determine whether the change requires additional (or fewer) resources than are currently assigned to the PPC, make resource changes if any are required, and send a PPC scaling acknowledgement 628.

Clients may determine the attributes or properties of PPCs set up on their behalf by submitting DescribePPC requests 631 in the depicted embodiment. In response, the configuration manager may bundle a set of properties of the PPC indicated in the describe request, and provide a PPC descriptor 633 to the client. In at least some embodiments, clients 604 may be able to associate specified networking addresses (e.g., IP addresses that are accessible from within the client's IVN) with a PPC, and may do so by submitting a SetupPPCAddress request 637. The configuration manager 180 may make initiate or perform the necessary changes to associate the indicated network address with the PPC, and provide an address change acknowledgement 639 to the client. When a client 604 determines that a PPC is no longer needed, a TearDownPPC request 643 may be submitted. In response, the configuration manager 180 may free the resources currently allocated for the specified PPC and provide a teardown acknowledgement 645 to the client. In at least one embodiment, one or more of the request types illustrated in FIG. 6 may not be supported by the VPPS. In some embodiments, additional request types, such as requests to register new types of packet processing operations, may be supported. For example, in a RegisterPacketProcessingModule request, a client may provide code (e.g., either in source code form or in executable form) for a new type of packet processing that can be added to the VPPS library. In response, the configuration manager may validate that the module meets a set of acceptance criteria for inclusion in the library, and send an indication to the client indicating the results of its acceptance checking.

Packet Processing Rules

Figure 7:
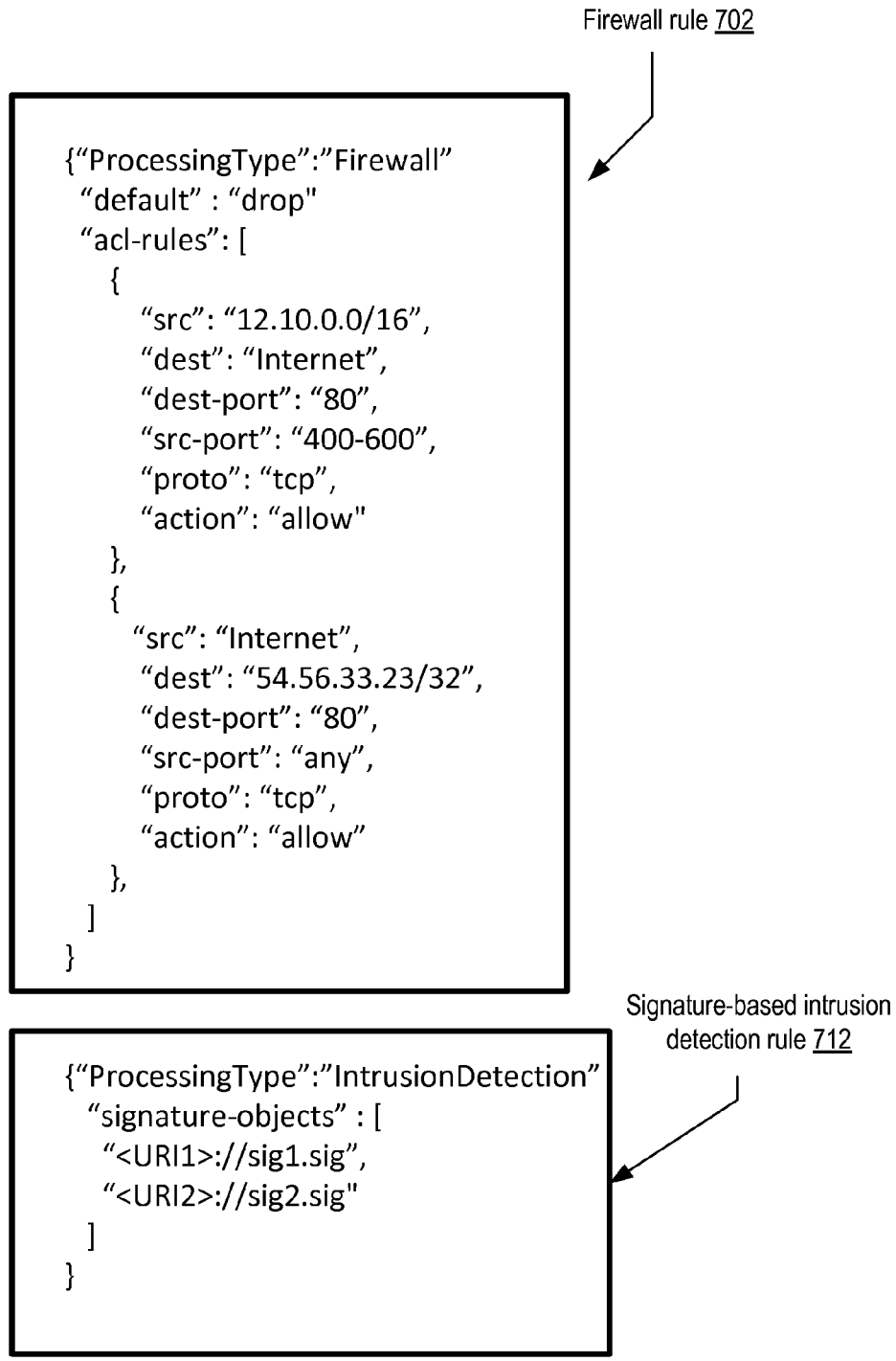
FIG. 7 illustrates simple examples of packet processing rules that may be indicated by a client of a VPPS in a request for a PPC, according to at least some embodiments.

FIG. 7 illustrates simple examples of packet processing rules that may be indicated by a client of a VPPS in a request for a PPC, according to at least some embodiments. Firewall rule 702 and intrusion detection rule 712 are each written in a JSON (JavaScript Object Notation)-like syntax in the depicted embodiment, although other languages and/or encodings may be used in other embodiments. In some embodiments, one or more such rules may be included in respective text files, and the combination of the text files indicating the rules for a given PPC setup request may be provided to the configuration manager 180 of the VPPS as a compressed (e.g., zip) file.

The "ProcessingType" element of the rule may indicate the category or type of packet processing to be performed: e.g., "Firewall" for rule 702 or "IntrusionDetection" in the case of rule 712. In the firewall rule 702, the default action is to drop packets, and two sets of exceptions are specified to the default rule. If the source address ("src") is in the IP address range 12.10.0.0/16, the source port ("src-port") is in the range 400-600, the destination ("dest") is the Internet, and the destination port ("dest-port") is 80, TCP packets (as indicated in the "proto" element) are to be transmitted. Also, if the source address is in the Internet, the destination address is in the IP address range 54.56.33.23/32, and the destination port is 80, TCP packets from any source port are to be allowed.

In the intrusion detection rule 712, respective URLs (Universal Resource Locators) URL1 and URL2 are provided for respective signature objects defining two types of intrusions that are to be detected. The packet processing modules of the compute instances set up as nodes of the PPC may each be responsible for parsing the contents of the signature objects and checking that the stream of packets received at the PPC does not represent an example of the behavior indicated in the signature objects. The signature-based intrusion detection rule 712 may represent an example of a stateful packet processing operation, in which for example more than one packet of a sequence of packets may have to be analyzed to determine whether a specified pattern of behavior is occurring. It is noted that while fairly straightforward examples of packet processing rules are illustrated in FIG. 7 to simplify the presentation, more elaborate rules may be specified in practice in various embodiments. In at least some embodiments, a given PPC may be used to implement a variety of different packet processing rules—that is, multiple rules corresponding to different types of packet processing operations (e.g., firewall and intrusion detection), or corresponding to different subsets of traffic on which the same type of packet processing operations are to be performed, may be indicated in a PPC setup request by a client. In one embodiment, the rules used previously by clients may be stored in the VPPS metadata repository 595, and clients may be able to utilize the stored rules (e.g., by re-using a particular rule, or by retrieving a previously-used rule and using it as a template to generate a new rule) for their ongoing packet processing needs.

Methods for Virtualization-Based Packet Processing

Figure 8:
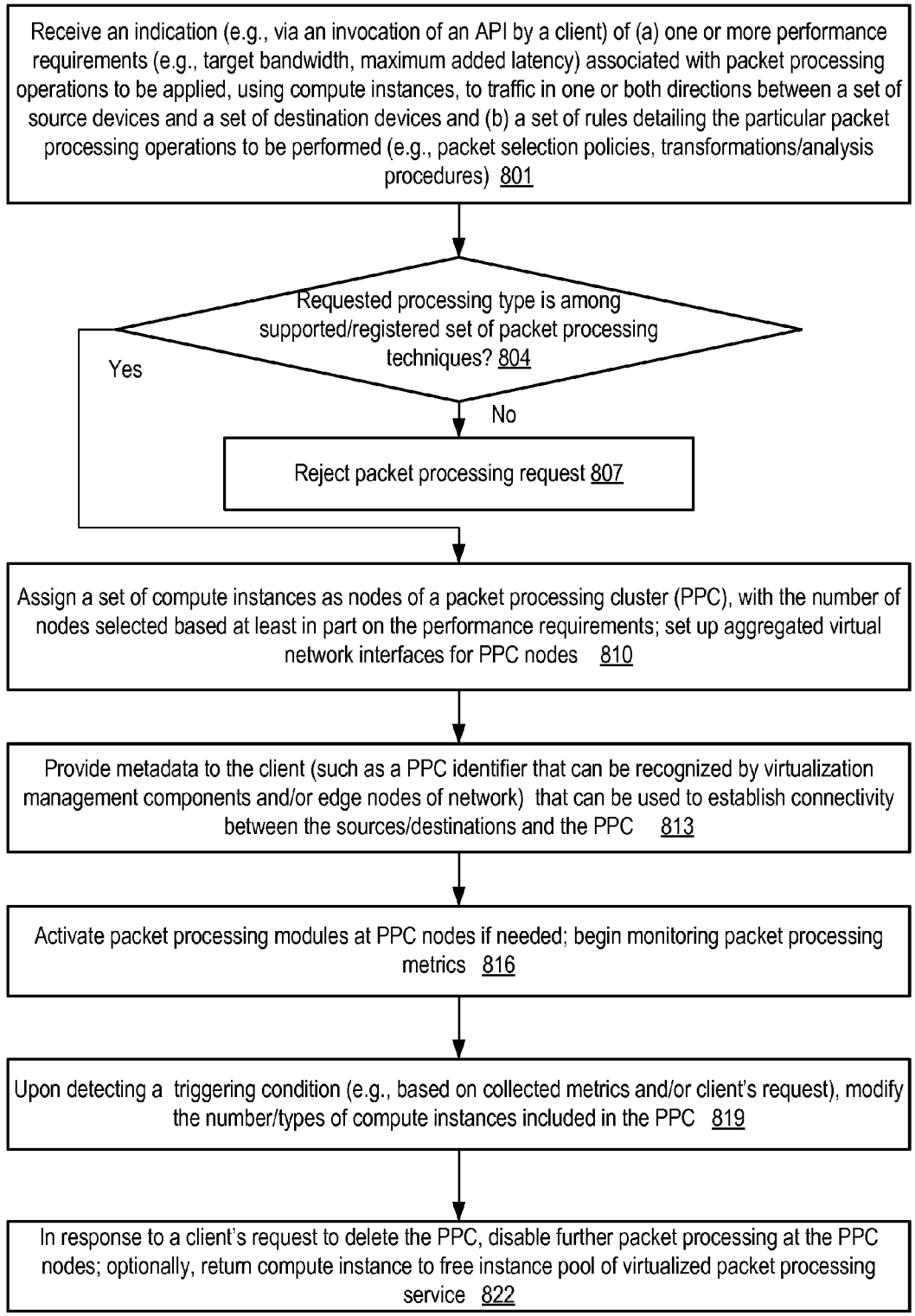
FIG. 8 is a flow diagram illustrating aspects of operations that may be performed to implement virtualization-based packet processing, according to at least some embodiments.

FIG. 8 is a flow diagram illustrating aspects of operations that may be performed to implement virtualization-based packet processing, according to at least some embodiments. As shown in element 801, a component of a VPPS (such as a configuration manager 180) may receive an indication (e.g., via an invocation of an API by a client) of one or more performance requirements (such as a target bandwidth to be supported, or a maximum added latency resulting from the processing) associated with a set of requested packet processing operations. The requested packet processing operations may be intended to be performed, using compute instances of a provider network, on traffic in one or both directions between a set of source devices and a set of destination devices. Such a packet processing request may also be referred to as a setup request for a PPC. In at least some embodiments, a set of rules detailing the particular packet processing operations to be performed (e.g., packet selection policies, transformations/analysis procedures) may be included in the client's request. In at least some embodiments, clients may refer to rules that have been used previously and are stored in a VPPS repository, instead of including the rules in their setup request. In some embodiments, the VPPS may publish a set of rule formatting specifications or a grammar, indicating the syntax that a client should use to specify various attributes of their requirements (for example, in an industry-standard language such as Python, Ruby, Perl, JSON, or the like, or in a proprietary language supported by the VPPS). In one implementation, the performance requirements may be included with the rules—e.g., the same file or script may be used to specify performance goals, the types of processing to be performed on selected packets, as well as the selection criteria for packet selection.

As indicated in element 804, the VPPS may validate the request, e.g., by checking that the requested packet processing operations are among a set of supported or registered packet processing techniques of the service. If the requested types of operations are not supported, or if the request does not meet the formatting requirements of the VPPS, the packet processing request may be rejected (element 807). In some embodiments, a client request may also be rejected if the VPPS does not have sufficient resources to meet the performance targets of the request.

If the requested type of packet processing is supported (as also detected in element 804), and if the VPPS has sufficient resources (e.g., currently unallocated instances in a pool 130 such as that shown in FIG. 1) to meet the requested performance goals, the configuration manager may determine the initial number (and types) of compute instances to be included in a PPC for the client (element 810). In some embodiments, all the compute instances available for allocation by a configuration manager to a PPC may be capable of performing all the different types of supported packet processing operations. In other embodiments, one subset of the compute instances usable as PPC nodes may be configured with a first set of packet processing modules capable of a first group of packet processing operations, while another subset of the compute instances in the VPPS pool may be configured with a second set of packet processing modules capable of a different group of packet processing operations. In such scenarios, when selecting the specific compute instances to be included in a given PPC, the configuration manager may have to ensure that enough compute instances with the appropriate packet processing capabilities are available. In at least some embodiments, at least a subset of the networking configuration tasks that may eventually be required for the PPC may also be performed by the configuration manager at this stage: e.g., a number of virtual network interfaces may be assigned to the PPC and logically combined or aggregated.

Metadata that can be used to establish connectivity between the PPC and the sources/destinations, such as an alias or identifier of the PPC, or a network address assigned to the PPC, may be provided to the client (element 813). The packet processing modules at the PPC's nodes may be activated (e.g., respective processes or threads may be started up if they have not already been started up) (element 816). The configuration manager may begin monitoring various metrics related to packet processing, such as the rate at which the processing operations are performed, resource utilization levels (e.g., CPU usage levels, memory usage levels, or incoming and outgoing network traffic flow rates) at the PPC nodes, and so on.

In response to a detection of a triggering condition (e.g., based on the metrics being collected, based on an examination of log records generated by the packet processing modules of the compute instances of the PPC, and/or based on performance requirement change requests received from the client), the configuration manager may determine that the population of the PPC should be changed (element 819). For example, if the configuration manager determines that more compute instances, or more computationally powerful compute instances, should be included than are currently in the PPC, new instances may be set up. If the configuration manager determines that too many instances have been set up, e.g., if the workload of packet processing can be handled by fewer or less powerful compute instances, some of the existing instances may be removed or replaced with less performant instances.

In at least some embodiments, PPCs may remain in operation for relatively long periods, such as weeks or months. Eventually, it may be the case that the packet processing operations initially requested by a client are no longer necessary. In such a scenario, as shown in element 822 of FIG. 8 the client may submit a programmatic request to shut down the PPC (e.g., the equivalent of the TearDown-PPC request 643 shown in FIG. 6). In response, in some embodiments the configuration manager may de-activate the packet processing modules if necessary, disconnect the PPC nodes from their existing networks, and/or place the compute instances that were assigned to the PPC in a pool of free instances.

It is noted that in various embodiments, operations other than those illustrated in the flow diagram of FIG. 8 may be used to implement at least some of the techniques for supporting virtualization-based packet processing. Some of the operations shown may not be implemented in some embodiments, may be implemented in a different order than illustrated in FIG. 8, or in parallel rather than sequentially.

Use Cases

The techniques described above, of establishing scalable groups of virtualized compute servers (compute instances) to perform various types of network processing operations at line speeds or close-to-line speeds, may be useful in a variety of scenarios. As more and more distributed applications are migrated to provider network environments, and the sophistication of network-based attackers increases, the need for securing and isolating client applications from network intrusions originating in the public Internet is also increasing. In addition to security-related packet processing operations, the need for fast implementation of other types of low level networking operations such as load balancing, packet encapsulation and the like is also growing. The ability to establish dynamically reconfigurable clusters of compute instances capable of performing a variety of packet processing tasks may simplify the tasks of application owners.

Illustrative Computer System

Figure 9:
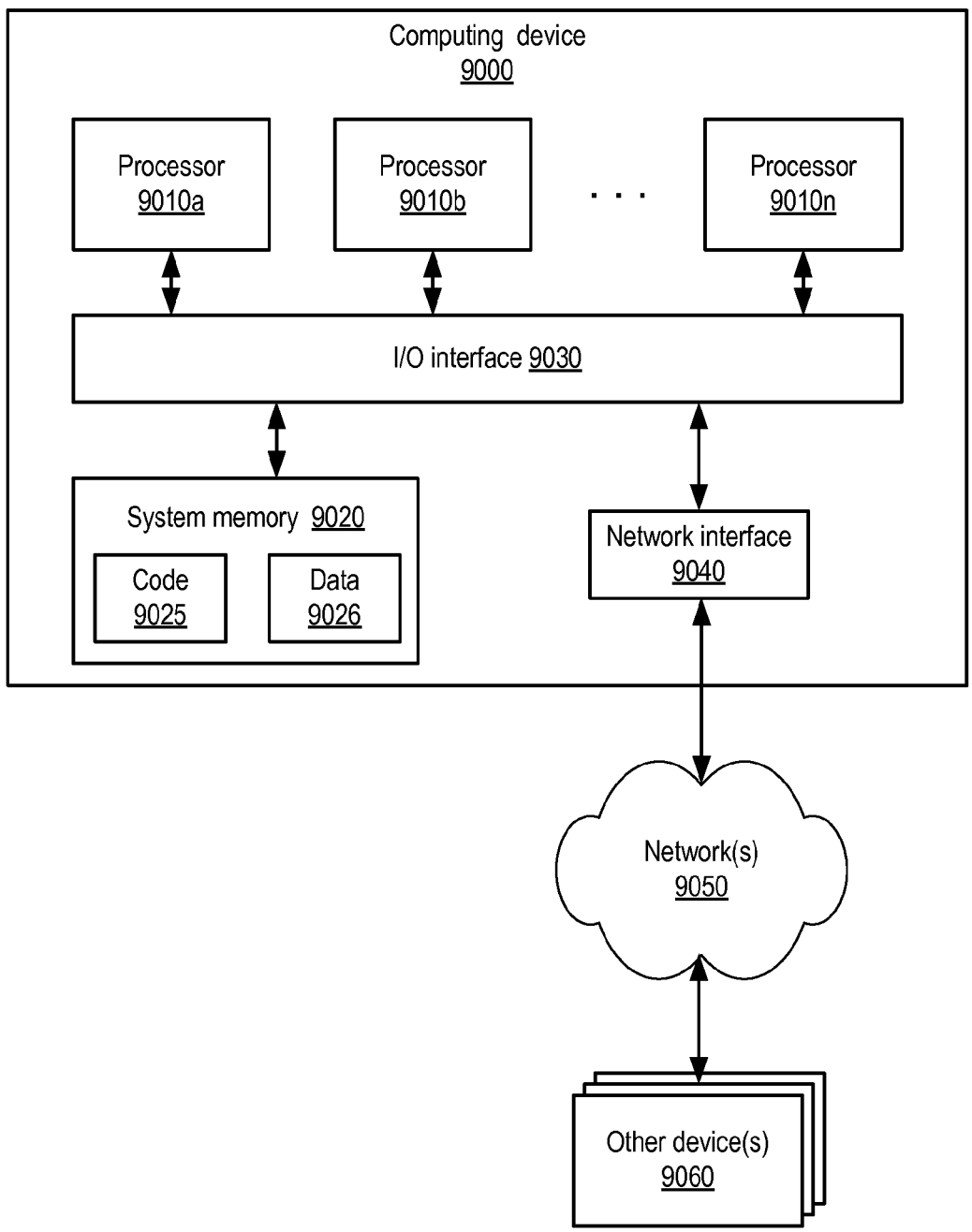
FIG. 9 is a block diagram illustrating an example computing device that may be used in at least some embodiments.

In at least some embodiments, a server that implements one or more of the components that are used to support virtualization-based packet processing, such as configuration managers, packet processing modules, VMCs, edge devices and the like, may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a configuration manager of a virtualization-based packet processing service implemented at a provider network; and
   one or more instance hosts;
   wherein the configuration manager is configured to:
      receive an indication of (a) a performance goal associated with at least a first category of packet processing operations to be performed using compute instances of the provider network, and (b) one or more packet processing rules, including a first rule which indicates a particular processing operation of the first category to be performed on packets selected, based at least in part on a first selection policy, from network traffic between one or more sources and one or more destinations;
      determine, based at least in part on the performance goal, a number of compute instances of the provider network to be assigned to a packet processing cluster, wherein more compute instances are assigned for a performance goal with a higher resource capacity requirement than are assigned for a performance goal with a lower resource capacity requirement;
      assign, based at least on the determined number of compute instances to be assigned to the packet processing cluster, a plurality of compute instances, including a first compute instance launched on a particular instance host of the plurality of instance hosts, as respective nodes of the packet processing cluster designated to perform the particular processing operation in accordance with the first rule, and wherein individual ones of the plurality of compute instances comprise a packet processing module configured to implement the particular processing operation according to the first rule;
      configure the packet processing cluster to receive the network traffic from the one or more sources and to process, by the respective nodes of the packet processing cluster, the network traffic in accordance with the one or more packet processing rules;
      provide, to a client of the service, metadata to be used to establish connectivity between the one or more sources of the network traffic and the packet processing cluster; and
      modify the number of compute instances assigned to the packet processing cluster, by assigning more or less compute instances to the packet processing cluster, based at least in part on a detection of a triggering condition.

2. The system as recited in claim 1, wherein the particular processing operation comprises one or more of: (a) a firewall operation, (b) an intrusion detection operation, (c) a network address translation (NAT) operation, (d) an encapsulation operation, (e) a load balancing operation, or (f) an operation implement a caching proxy.

3. The system as recited in claim 1, wherein the indication of at least one of: (a) the performance goal, or (b) the one or more packet processing rules, is received from the client via a programmatic interface implemented by the virtualization-based packet processing service.

4. The system as recited in claim 1, wherein the configuration manager is configured to:
   receive, from the client, an indication of a network address to be assigned to the packet processing cluster; and
   assign the network address to one or more virtual network interfaces configured for the packet processing cluster.

5. The system as recited in claim 1, wherein the detection of the triggering condition comprises one or more of: (a) a determination that the performance goal has changed, (b) a determination that the number of compute instances assigned to the packet processing cluster is insufficient to achieve the performance goal, or (c) a determination that a combined resource capacity of the number of compute instances assigned to the packet processing cluster exceeds a resource capacity required to achieve the performance goal.

6. A method, comprising:
   performing, by a configuration manager of a virtualization-based packet processing service:
      determining (a) a targeted performance metric associated with at least a first category of packet processing operations to be performed at compute instances of a virtual computing service, and (b) one or more packet processing rules, including a first rule which indicates a particular processing operation of the first category to be performed on selected packets;
      determining, based at least in part on the targeted performance metric, a number of compute instances of the provider network to be assigned to a packet processing cluster (PPC);
      assigning, based at least on the determined number of compute instances to be assigned to the packet processing cluster, a plurality of compute instances of the virtual computing service as respective nodes of a PPC designated to perform the particular processing operation in accordance with the first rule;

configuring the PPC to receive the network traffic from the one or more sources and to process, by the respective nodes of the PPC, the network traffic in accordance with the one or more packet processing rules;

providing, to a client of the service, metadata to be used to establish connectivity between the PPC and at least a source of the network traffic from which packets are to be selected for the particular processing operation; and modifying the number of compute instances assigned to the PPC, by assigning more or less compute instances to the packet processing cluster, based at least in part on detecting a triggering condition.

7. The method as recited in claim 6, wherein said detecting the triggering condition comprises one or more of: (a) determining that the targeted performance metric has changed, (b) determining that the number of compute instances assigned to the PPC is insufficient to achieve the targeted performance metric, or (c) determining that a combined resource capacity of the number of compute instances assigned to the PPC exceeds a resource capacity required to achieve the targeted performance metric.

8. The method as recited in claim 6, further comprising performing, by the configuration manager:
instantiating a distributed data store accessible from the plurality of compute instances; and
storing, within the distributed data store, a representation of the one or more packet processing rules.

9. The method as recited in claim 6, wherein the plurality of compute instances comprise a first compute instance and a second compute instance, further comprising:
instantiating, by the configuration manager, a distributed data store accessible from the first compute instance and the second compute instance;
storing, within the distributed data store by the first compute instance, state information pertaining to the particular packet processing operation; and
retrieving, from the distributed data store by the second compute instance, the state information pertaining to the particular packet processing operation.

10. The method as recited in claim 9, wherein said retrieving is performed by the second compute instance in response to determining that the second compute instance is to assume a packet processing workload previously assigned to the first compute instance.

11. The method as recited in claim 9, wherein the distributed data store comprises one or more of: (a) an instance of an in-memory database (b) an instance of a persistent relational database, or (c) an instance of a persistent non-relational database.

12. The method as recited in claim 6, wherein the source of the network traffic comprises a different compute instance launched at a particular instance host of a provider network, wherein the particular instance host includes a virtualization management component (VMC), further comprising:
selecting, by the VMC based at least in part on an indication of the PPC as a destination in a route table accessible by the VMC, a particular compute instance of the plurality of compute instances assigned to the PPC as a destination for a particular packet.

13. The method as recited in claim 6, wherein the source of the network traffic comprises an edge device of a provider network, further comprising:
in accordance with a designation of the PPC as a destination for packets received from one or more devices external to the provider network, selecting, by the edge device, a particular compute instance of the one or more compute instances assigned to the PPC as a destination for a particular packet received at the edge networking device from the public Internet.

14. The method as recited in claim 6, further comprising performing, by the configuration manager:
instantiating, prior to said providing the metadata, one or more virtual network interfaces for respective ones of the plurality of compute instances.

15. A non-transitory computer-accessible storage medium storing program instructions that when executed on one or more processors implements a control-plane component of a virtualization-based packet processing service, wherein the control-plane component is configured to:
determine (a) a targeted performance metric for at least a first category of packet processing operations to be performed at compute instances of a virtual computing service, and (b) one or more packet processing rules, including a first rule which indicates a particular processing operation of the first category to be performed on selected packets;
determine, based at least in part on the targeted performance metric, a number of compute instances of the provider network to be assigned to a packet processing cluster (PPC);
assign, based at least on the determined number of compute instances to be assigned to the packet processing cluster, a plurality of compute instances of the virtual computing service as respective nodes of a PPC designated to perform the particular processing operation in accordance with the first rule;
configure the PPC to receive the network traffic from the one or more sources and to process, by the respective nodes of the PPC, the network traffic in accordance with the one or more packet processing rules;
provide, to a client of the service, metadata to be used to establish connectivity between a source of the network traffic and the PPC; and
modify the number of compute instances assigned to the PPC, by assigning more or less compute instances to the packet processing cluster based at least in part on a detection of a triggering condition.

16. The non-transitory computer-accessible storage medium as recited in claim 15, wherein the control-plane component is further configured to detect the triggering condition based at least in part on an examination of log records generated by the plurality of compute instances.

17. The non-transitory computer-accessible storage medium as recited in claim 15, wherein the control-plane component is further configured to:
instantiate a data store accessible from the plurality of compute instances; and
store, within the distributed data store, an indication of the one or more packet processing rules.

18. The non-transitory computer-accessible storage medium as recited in claim 15, wherein an indication of at least one of: (a) the targeted performance metric, or (b) the one or more packet processing rules, is received at the control-plane component from the client via a programmatic interface.

19. The non-transitory computer-accessible storage medium as recited in claim 15, wherein the control-plane component is further configured to:
receive, from the client, an indication of a network address to be assigned to the PPC; and assign the network address to one or more virtual network interfaces configured for the PPC.

* * * * *